United States Patent
Yamamoto et al.

(10) Patent No.: US 12,114,683 B2
(45) Date of Patent: Oct. 15, 2024

(54) GELLING COMPOSITION AND FOOD CONTAINING THE SAME

(71) Applicant: SHIN-ETSU CHEMICAL CO., LTD., Tokyo (JP)

(72) Inventors: Atsushi Yamamoto, Joetsu (JP); Shingo Niinobe, Joestu (JP); Akira Kitamura, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 516 days.

(21) Appl. No.: 15/604,833

(22) Filed: May 25, 2017

(65) Prior Publication Data

US 2017/0347694 A1    Dec. 7, 2017

(30) Foreign Application Priority Data

Jun. 1, 2016  (JP) ................. 2016-110401

(51) Int. Cl.
| | | |
|---|---|---|
| A23L 29/262 | (2016.01) | |
| A23L 29/256 | (2016.01) | |
| A23L 29/281 | (2016.01) | |
| A23L 33/24 | (2016.01) | |
| A23P 30/10 | (2016.01) | |

(52) U.S. Cl.
CPC ........... *A23L 29/262* (2016.08); *A23L 29/256* (2016.08); *A23L 29/284* (2016.08); *A23L 33/24* (2016.08); *A23P 30/10* (2016.08); *A23V 2002/00* (2013.01)

(58) Field of Classification Search
None
See application file for complete search history.

(56) References Cited

U.S. PATENT DOCUMENTS

| | | | |
|---|---|---|---|
| 2010/0055207 A1* | 3/2010 | Holahan | A23L 29/212 424/722 |
| 2012/0258195 A1 | 10/2012 | Sliwinski | |
| 2013/0059059 A1 | 3/2013 | Tristram et al. | |
| 2014/0178556 A1 | 6/2014 | Yun et al. | |
| 2015/0045292 A1 | 2/2015 | Huebner-Keese et al. | |
| 2016/0081384 A1* | 3/2016 | Deo | C08J 3/03 514/57 |

FOREIGN PATENT DOCUMENTS

| | | |
|---|---|---|
| JP | 2014-236700 A | 12/2014 |
| JP | 2015-120911 A | 7/2015 |

OTHER PUBLICATIONS

Oct. 11, 2017 Search Report issued in European Patent Application No. 17173546.7.
Feb. 22, 2019 Office Action issued in European Patent Application No. 17173546.7.
Apr. 8, 2019 Office Action issued in Japanese Patent Application No. 2016-110401.

* cited by examiner

*Primary Examiner* — Lien T Tran
(74) *Attorney, Agent, or Firm* — Oliff PLC

(57) ABSTRACT

Provided is a gelling composition capable of keeping a gel state in a food even when the food heated at 75° C. is cooled to around 45° C. at which the food can be eaten in a warm state. Specifically provided is a gelling composition comprising methyl cellulose, a 2.0% by weight aqueous solution of which has a storage modulus G' (75° C.) at 75° C. of 3,000 to 5,500 Pa, the 2.0% by weight aqueous solution of which has a return temperature storage modulus G' (75 to 45° C.) of 2,000 to 3,600 Pa when the temperature of the aqueous solution is returned from 75° C. to 45° C., and a 2.0% by weight aqueous solution of which has a viscosity at 20° C. of 3,000 to 10,000 mPa·s; a low temperature gelling agent; and a solvent. A food comprising the gelling composition is also provided.

16 Claims, No Drawings

GELLING COMPOSITION AND FOOD CONTAINING THE SAME

BACKGROUND OF THE INVENTION

1. Field of the Invention

The present invention relates to a gelling composition and a food containing the gelling composition.

2. Related Art

There are now many elderly people as life expectancy becomes longer, and many people suffer from difficulty in eating or swallowing due to a reduction in swallowing function associated with aging or due to a brain disease or an oral cavity or pharyngeal disorder. In particular, elderly people may be unlikely to cause swallowing reflex due to a reduction in eating or swallowing function, and may accidentally aspirate water or food from the bronchial tubes into the lungs, causing a serious disease including pneumonia. To address such an accident, there is a demand for such a form of food as a jellied food that is easy to be orally taken by people having difficulty in eating or swallowing.

In order to control the hardness, the adhesiveness or the cohesiveness (aggregability of a food) as food properties to such a degree as to be demanded by people having difficulty in eating or swallowing, a food processed into a paste or a soft food has been provided. Such a conventional food for people having difficulty in eating or swallowing is, however, unsatisfactory in appearance, texture or the like as compared with common foods. Since a low temperature gelling agent is used to control physical properties during processing of a food into a paste, such a food is softened and melted when warmed, thereby resulting in the food having physical properties out of those suited for swallowing in many cases. Thus, a warm food is difficult to serve. In particular, when a meal is served in care houses, hospitals or similar facilities, it is required to heat the foods at 75° C., which is measured at the center of a food, for 10 minutes or more before served. In such conditions, a low temperature gelling agent is melted and fails to hold the food shape.

To address such a problem, JP 2014-236700A discloses, as a method of maintaining the hardness and the adhesiveness of a food for people having difficulty in eating or swallowing even when the food is heated, a combination of methyl cellulose or hydroxypropyl methyl cellulose as a gelling agent that is solidified by heating and a gelling agent such as agar and carrageenan that is solidified by cooling.

SUMMARY OF THE INVENTION

In JP 2014-236700A, a food turned into a gel at a heating temperature of not less than the gelation temperature of methyl cellulose or hydroxypropyl methyl cellulose can maintain hardness or adhesiveness, but the food cooled to around 45° C. at which the food can be actually eaten in a warm state, cannot maintain the gel state and is turned into a viscos solution. Such a food has higher adhesiveness to be sticky in the mouth, and this is one of causes for food sticking in the throat.

An object of the invention is to provide a gelling composition that holds the shape of a food at a heating temperature before a meal is served, prevents syneresis by heating, and can control the hardness, the adhesiveness and the cohesiveness (aggregability of a food) even when the food is then eaten around 45° C.

As a result of intensive studies for attaining the above object, the inventors have found that a combination of particular methyl cellulose with a low temperature gelling agent allows a food to have a stable shape from a high temperature state to a warm state and can control the hardness, the adhesiveness and the cohesiveness of a food, and have completed the present invention.

In an aspect of the invention, there is provided a gelling composition comprising methyl cellulose, a 2.0% by weight aqueous solution of which has a storage modulus G' (75° C.) at 75° C. of 3,000 to 5,500 Pa, a 2.0% by weight aqueous solution of which has a return temperature storage modulus G' (75 to 45° C.) of 2,000 to 3,600 Pa when a temperature of the aqueous solution is returned from 75° C. to 45° C., and a 2.0% by weight aqueous solution of which has a viscosity at 20° C. of 3,000 to 10,000 mPa·s; a low temperature gelling agent; and a solvent. In another aspect of the invention, there is provided a food comprising the gelling composition.

According to the invention, the composition can hold the shape of a food even at 75° C. and can reduce syneresis from a food by heating. The composition can also impart such hardness, adhesiveness and cohesiveness to a food as to be easily orally taken by people having difficulty in eating and swallowing when the temperature of the food is returned from 75° C. to 45° C.

DETAILED DESCRIPTION OF THE PREFERRED EMBODIMENTS (1) Methyl Cellulose

According to the invention, such methyl cellulose that a 2.0% by weight aqueous solution of the methyl cellulose has a storage modulus G' (75° C.) at 75° C. of 3,000 to 5,500 Pa, a 2.0% by weight aqueous solution of the methyl cellulose has a return temperature storage modulus G' (75 to 45° C.) of 2,000 to 3,600 Pa when the temperature of the aqueous solution is returned from 75° C. to 45° C., and a 2.0% by weight aqueous solution of the methyl cellulose has a viscosity at 20° C. of 3,000 to 10,000 mPa·s, can be used.

The methyl cellulose can be produced, for example, by a method for producing methyl cellulose comprising the steps of: mixing a cellulose pulp and a first alkali metal hydroxide solution with stirring to obtain alkali cellulose; reacting the alkali cellulose with a methylating agent to obtain a first reaction mixture; blending the first reaction mixture with a second alkali metal hydroxide solution with stirring and without further blending any methylating agent to obtain a second reaction mixture; and purifying the second reaction mixture to obtain methyl cellulose; wherein a ratio of the weight of a first alkali metal hydroxide in the first alkali metal hydroxide solution to the total weight of the first alkali metal hydroxide and a second alkali metal hydroxide in the second alkali metal hydroxide solution is preferably 50 to 86%.

The cellulose pulp is exemplified by a wood pulp and a linter pulp, and is a material used for production of conventional methyl cellulose. The intrinsic viscosity, which is an index of the polymerization degree of a cellulose pulp, can be appropriately selected depending on the viscosity of an aqueous solution of intended methyl cellulose, and is preferably 600 to 1,200 ml/g, more preferably 800 to 1,000 ml/g at 25° C. The intrinsic viscosity of a cellulose pulp can be determined in accordance with Method A in Japanese Industrial Standards (JIS) P8215.

The cellulose pulp contains cellulose and water, and in the description of the present specification, the content of the "cellulose in a cellulose pulp" can be determined in accordance with method A in JIS P8215.

The cellulose pulp is preferably a cellulose pulp powder prepared by pulverization with a pulverizer. The pulp pulverizer may be any pulverizer that can make a cellulose pulp into a powder. Examples of the pulverizer can include a knife mill, a cutting mill, a hammer mill, a ball mill and a vertical roller mill. The cellulose pulp powder preferably has a weight-average particle diameter $D_{50}$ of 30 to 400 µm. The weight-average particle diameter $D_{50}$ of cellulose pulp powder is determined by the method comprising the steps of: placing a pulp powder on a top test sieve of the test sieves having various mesh sizes in accordance with JIS Z8801 installed in a Ro-Tap® sieve shaker; sieving the pulp powder by vibration or tapping; and measuring the weight on each sieve and the weight under the sieves so as to obtain the weight distribution and the average particle diameter at an integrated value of 50% as the weight-average particle diameter $D_{50}$.

The step of mixing a cellulose pulp and a first alkali metal hydroxide solution with stirring to obtain alkali cellulose will be described.

The alkali metal hydroxide solution is blended in two stages, by being divided into a first alkali metal hydroxide solution and a second alkali metal hydroxide solution. The alkali metal hydroxide solution is not particularly limited. Examples of the alkali metal hydroxide solution include a sodium hydroxide solution and a potassium hydroxide solution, and an aqueous sodium hydroxide solution is preferred from the standpoint of economy. A first alkali metal hydroxide in the first alkali metal hydroxide solution is preferably the same as a second alkali metal hydroxide in the second alkali metal hydroxide solution. For example, sodium hydroxide may be selected as each of the first and second alkali metal hydroxides. However, the first and second alkali metal hydroxides may be a combination of different hydroxides. For example, sodium hydroxide may be selected as the first alkali metal hydroxide, while potassium hydroxide may be selected as the second metal hydroxide.

The blending of the alkali metal hydroxide solution is preferably adding of the alkali metal hydroxide solution to a cellulose pulp, which is exemplified by direct dropping of the alkali metal hydroxide solution or spraying of the alkali metal hydroxide solution. The spraying is preferred because the resulting alkali cellulose has good uniformity.

The concentration of the alkali metal hydroxide in the alkali metal hydroxide solution is preferably 10 to 60% by weight, more preferably 30 to 50% by weight from the standpoint of etherification efficiency and handleability. The first alkali metal hydroxide and the second alkali metal hydroxide preferably have the same concentration, but may have different concentrations.

The step of mixing a cellulose pulp with an alkali metal hydroxide solution with stirring is carried out preferably in a reactor having an inner stirring structure. The reactor is preferably equipped with a device capable of measuring the inner temperature.

Before a first alkali metal hydroxide solution and a cellulose pulp are mixed with stirring, it is preferred that the oxygen in the reactor be removed by a vacuum pump or the like and be replaced with an inert gas, preferably nitrogen, to suppress depolymerization which can proceed in the presence of an alkali metal hydroxide and oxygen.

Regarding an amount of the first alkali metal hydroxide solution, a mole ratio of the first alkali metal hydroxide to the cellulose in the cellulose pulp (first alkali metal hydroxide/cellulose) is preferably 2.0 to 4.0, more preferably 2.7 to 3.5. When the mole ratio of the first alkali metal hydroxide to the cellulose is less than 2.0, the gelation temperature can be excessively lowered so that viscosity may not be expressed, and methyl cellulose having high shape retention properties may not be produced. When the mole ratio is more than 4.0, methyl cellulose having high shape retention properties may not be produced.

The ratio of the weight of a first alkali metal hydroxide in the first alkali metal hydroxide solution to the total weight of the first alkali metal hydroxide and a second alkali metal hydroxide in the second alkali metal hydroxide solution is preferably 50 to 86%, more preferably 65 to 80%, even more preferably 65 to 75%. When the ratio of the weight of the first alkali metal hydroxide to the total weight of the first and second alkali metal hydroxides is less than 50%, the gelation temperature may be lowered so that viscosity may not be expressed and methyl cellulose having high shape retention properties may not be produced. When the ratio of the weight of the first alkali metal hydroxide to the total weight of the first and second alkali metal hydroxides is more than 86%, methyl cellulose having high shape retention properties may not be produced.

The inside temperature of the reactor during blending of the cellulose pulp with the first alkali metal hydroxide, preferably during addition of the first alkali metal hydroxide solution to the cellulose pulp, is preferably 10 to 80° C., more preferably 30 to 70° C. from the standpoint of uniform alkali cellulose.

The blending rate of the first alkali metal hydroxide in the first alkali metal hydroxide solution means the molar amount of the first alkali metal hydroxide added per unit time relative to 1 mol of the cellulose pulp, and is preferably 1.5 to 48 [mol/mol·hr], more preferably 4.8 to 18.6 [mol/mol·hr], even more preferably 8 to 15 [mol/mol·hr] from the standpoint of uniform mixing of the first alkali metal hydroxide solution in the system.

After the addition of the first alkali metal hydroxide solution, the mixing with stirring can be continued for another 5 to 30 minutes to make the alkali cellulose in more uniform state.

In order to suppress local generation of heat in the reactor, an organic solvent not affecting the methylation, such as dimethyl ether, can be added to the system before, during, or after the addition of the first alkali metal hydroxide solution.

Next, the produced alkali cellulose is reacted with a methylating agent to obtain a first reaction mixture.

Examples of the methylating agent include methyl chloride, dimethyl sulfate and methyl iodide, and methyl chloride is preferred from the standpoint of the solubility of the resulting methylcellulose in water and economy.

The inside temperature of the reactor during the reaction with the methylating agent is preferably 40 to 90° C., more preferably 50 to 80° C. from the standpoint of reaction control.

Regarding an amount of the methylating agent, a mole ratio of a molar amount of the methylating agent to the total molar amount of the first and second alkali metal hydroxides (methylating agent/total alkali metal hydroxide) is preferably 0.8 to 1.5, more preferably 1.0 to 1.3. When the mole ratio (i.e. methylating agent/total alkali metal hydroxide) is less than 0.8, the required degree of substitution of methoxy groups may not be obtained. Blending of the methylating agent at the mole ratio of more than 1.5 may lead to an economic disadvantage.

Regarding the blending of the methylating agent, the methylating agent is preferably added to the alkali cellulose. The addition time for adding the methylating agent is preferably 30 to 120 minutes, more preferably 40 to 90 minutes from the standpoint of reaction control and productivity.

The methyl cellulose in the first reaction mixture has a degree of substitution (DS) of methoxy groups of preferably 0.75 to 1.68, more preferably 0.81 to 1.68, even more preferably 0.99 to 1.37 from the standpoint of obtaining an intended viscosity or storage modulus. The degree of substitution (DS) means an average number of hydroxyl groups replaced by methoxy groups per glucose ring unit of cellulose.

Subsequently, the methylated first reaction mixture is blended with a second alkali metal hydroxide solution without further blending of any methylating agent, and mixed with stirring to obtain a second reaction mixture.

The timing of blending the second alkali metal hydroxide solution with the first reaction mixture, in other words, the timing of starting to blend the second alkali metal hydroxide solution, is preferably after 80% by weight or more of the total amount of the methylating agent to be blended has been added, and is more preferably after the completion of the addition of the methylating agent. When the timing of starting to add the second alkali metal hydroxide solution is before 80% by weight of the total amount of the methylating agent to be blended has been added, methyl cellulose having high shape retention properties may not be produced.

Regarding the amount of the second alkali metal hydroxide in the second alkali metal hydroxide solution, a mole ratio of the second alkali metal hydroxide in the second alkali metal hydroxide solution to the cellulose in the cellulose pulp (second alkali metal hydroxide/cellulose) is preferably 0.65 to 2.0, more preferably 0.88 to 1.48. When the mole ratio (i.e. second alkali metal hydroxide/cellulose) is less than 0.65, methyl cellulose having high shape retention properties may not be produced. When the mole ratio is more than 2.0, the gelation temperature may be excessively lowered so that viscosity may not be expressed and methyl cellulose having high shape retention properties may not be produced.

The inside temperature of the reactor at the start of the blending of the second alkali metal hydroxide solution with the first reaction mixture, preferably at the start of the addition of the second alkali metal hydroxide solution to the first reaction mixture, is preferably 65 to 90° C., more preferably 75 to 85° C. When the inside temperature of the reactor at the start of the addition of the second alkali metal hydroxide solution is less than 65° C., methyl cellulose having high shape retention properties may not be produced. When the inside temperature of the reactor at the start of the addition is more than 90° C., heat generation due to mercerization by the alkali metal hydroxide or exothermic reaction of methylation may not be controlled. From the standpoint of production of methyl cellulose having high shape retention properties, the inside temperature of the reactor at the completion of the blending of the second alkali metal hydroxide solution is preferably 80° C. to 100° C., more preferably 85 to 95° C. The temperature at the start of the addition is preferably lower than that at the completion of the addition, and the temperature difference therebetween is preferably 3 to 20° C., more preferably 4 to 15° C.

The blending rate of the second alkali metal hydroxide in the second alkali metal hydroxide solution means a molar amount of the second alkali metal hydroxide to be blended with the first reaction mixture per unit time relative to 1 mol of the cellulose in the cellulose pulp used as the starting material, and is preferably 0.5 to 9.6 [mol/mol·hr], more preferably 1.0 to 6.5 [mol/mol·hr], even more preferably 1.0 to 3.5 [mol/mol·hr]. When the blending rate of the second alkali metal hydroxide is less than 0.5 [mol/mol·hr], the time for blending the second alkali metal hydroxide is prolonged so that the reaction time may be extended. In addition, methyl cellulose having high shape retention properties may not be produced. When the blending rate of the second alkali metal hydroxide is more than 9.6 [mol/mol·hr], methyl cellulose having high shape retention properties may not be produced.

In the step of blending the second alkali metal hydroxide solution with the first reaction mixture, it is preferable to blend the second alkali metal hydroxide solution while increasing the inside temperature of the reactor at a constant rate from the start to the completion of the blending of the second alkali metal hydroxide solution from the standpoint of production of methyl cellulose having high shape retention properties. The temperature increase rate is preferably 3.0 to 50° C./hr, more preferably 8.0 to 45° C./hr, even more preferably 8.0 to 30° C./hr.

Typically, the alkali cellulose produced by mixing a cellulose pulp with an alkali metal hydroxide solution is etherified with a methylating agent to produce methyl cellulose. Herein, the methylating agent in the reaction system is gradually consumed as the etherification proceeds. When the inside temperature of the reactor is constant, the reaction rate of the etherification gradually decreases as the methylating agent is consumed in the reaction system. On this account, by blending the second alkali metal hydroxide solution while increasing the inside temperature of the reactor at a constant rate, the reduction of the reaction rate of the etherification caused by the consumption of the methylating agent in the reaction system is suppressed, and the reaction rate of the etherification associated with the blending of the second alkali metal hydroxide solution is relatively increased. As a result, methyl cellulose having high shape retention properties can be produced.

After the blending of the second alkali metal hydroxide solution, the mixing with stirring is preferably continued to complete the etherification.

The inside temperature of the reactor during the mixing with stirring after the blending of the second alkali metal hydroxide solution is preferably 80 to 120° C., more preferably 85 to 100° C. from the standpoint of reaction controllability. To complete the reaction, the mixture is preferably heated after the blending of the second alkali metal hydroxide solution.

The mixing time with stirring after the blending of the second alkali metal hydroxide solution is preferably 10 to 60 minutes, more preferably 20 to 40 minutes from the standpoint of productivity.

The obtained second reaction mixture may be purified in the same manner as the usual purification for crude methyl cellulose, to obtain methyl cellulose. The purification method comprises the steps of: for example, mixing the second reaction mixture with water of 60 to 100° C. in a stirring container to dissolve a salt generated as a by-product during the reaction; and then subjecting the suspension discharged from the stirring container to a separation operation for removal of the salt to obtain desired purified methyl cellulose. For the separation operation, for example, a rotary pressure filter may be used. After the separation operation, the product is dried with a dryer. Examples of the dryer may include a conductive heat transfer type stirring dryer.

The produced methyl cellulose may be optionally pulverized with a common pulverizer such as a ball mill, a roller mill and an impact grinder, and then may be classified through sieves to adjust the particle size.

The methyl cellulose preferably has a degree of substitution (DS) of methoxy groups of 1.61 to 2.03, more preferably 1.74 to 2.03. Methyl cellulose having a DS of less than 1.61 may not have high shape retention properties. In methods for producing methyl cellulose having a DS of more than 2.03, larger amounts of the methylating agent and the alkali metal hydroxide are required, which may be economically disadvantageous.

Generally, the DS represents the degree of substitution and means an average number of hydroxyl groups replaced by methoxy groups per glucose ring unit of cellulose.

The degree of substitution of methoxy groups of methyl cellulose can be determined by the Zeisel-GC method described in J. G. Gobler, E. P. Samscl, and G. H. Beaber, Talanta, 9, 474 (1962).

The gel strength of methyl cellulose is represented by the storage modulus G' (75° C.) at 75° C. of a 2.0% by weight aqueous solution of the methyl cellulose and the storage modulus G' (75 to 45° C.) of the 2.0% by weight aqueous solution when the temperature of the aqueous solution is returned from 75° C. to 45° C. at which a food can be eaten in a warm state. Generally, the storage modulus represents an elastic component in a solution, which is the component having such characteristics that the deformation caused by a force applied to a substance is returned to the original shape when the force is removed, and is an index of gel strength.

The storage modulus G' (75° C.) at 75° C. of a 2.0% by weight aqueous solution of the methyl cellulose is 3,000 to 5,500 Pa, preferably 3,500 to 5,300 Pa, more preferably 3,800 to 5,000 Pa, even more preferably 4,000 to 4,800 Pa. When the storage modulus G' (75° C.) is less than 3,000 Pa, a resulting food cannot maintain the shape thereof and is deformed. When the storage modulus G' (75° C.) is more than 5,500 Pa, a resulting gel has excessively high strength, and is still high when the temperature is returned from 75° C. to 45° C., so that such a food is not easily orally taken by people having difficulty in eating or swallowing.

The return temperature storage modulus G' (75 to 45° C.) of the 2.0% by weight aqueous solution when the temperature is returned from 75° C. to 45° C. is 2,000 to 3,600 Pa, preferably 2,300 to 3,300 Pa, more preferably 2,500 to 3,200 Pa, even more preferably 2,500 to 3,000 Pa. When the storage modulus G' (75 to 45° C.) is less than 2,000 Pa, such a hardness, adhesiveness and cohesiveness of a food as to be easily orally taken by people having difficulty in eating or swallowing cannot be achieved. When the storage modulus G' (75 to 45° C.) is more than 3,600 Pa, a resulting gel has excessively high strength and is not easily orally taken by people having difficulty in eating or swallowing, resulting in an unfavorable situation.

The storage modulus G' (75° C.) and the storage modulus G' (75 to 45° C.) of a 2.0% by weight aqueous solution of methyl cellulose can be determined with a rheometer such as MCR 502 manufactured by Anton Paar.

A 2.0% by weight aqueous solution of methyl cellulose is prepared by the following procedure.

A sample solution is prepared by the method comprising the steps of: placing an exact amount of methyl cellulose corresponding to 6.0 g of the dried methyl cellulose in a jar (i.e. a container having a diameter of 65 mm, a height of 120 mm and a volume of 350 ml); adding hot water of 98° C. to the container to reach a total amount of 300.0 g; covering the container with a cap; then stirring the mixture for 20 minutes at 350 to 450 rpm with a stirrer until a uniform dispersion is obtained; and stirring the resulting dispersion for dissolution in a water bath of 5° C. or less for 40 minutes to obtain the sample solution.

The storage modulus G' (75° C.) is measured by the method comprising the steps of: adjusting the temperature of a sample-measuring section of a rheometer at 10° C. in advance; pouring the prepared 2.0% by weight aqueous solution of the methyl cellulose into a CC27 measurement cup, which is a cylindrical aluminum container having a diameter of 30 mm and a height of 80 mm, to a marked line (25 ml); applying a distortion with an amplitude of 1% by using a bob cylinder (with a diameter of 26.7 mm and a height of 40.0 mm: CC27) at the frequency of 1 Hz to start the measurement; and increasing the temperature of the sample-measuring section from 10° C. at a rate of 2° C./min to collect data at a point per minute, wherein the storage modulus when the sample-measuring section reaches 75° C. is regarded as the storage modulus G' (75° C.) of the invention. After the sample-measuring section has reached 75° C., the sample is cooled at a rate of 1° C./min while keeping the distortion with an amplitude of 1% at the frequency of 1 Hz, wherein the storage modulus when the sample-measuring section reaches 45° C. is regarded as the storage modulus G' (75 to 45° C.) of the invention.

A 2.0% by weight aqueous solution of the methyl cellulose has a viscosity at 20° C. of 3,000 to 10,000 mPa·s, preferably 4,000 to 8,000 mPa·s, more preferably 4,000 to 6,000 mPa·s, determined by using a Brookfield type viscometer. When a 2.0% by weight aqueous solution has a viscosity of less than 3,000 mPa·s, a food containing such methyl cellulose has lower gel strength and thus cannot maintain the food shape. When a 2.0% by weight aqueous solution has a viscosity of more than 10,000 mPa·s, a resulting gelling composition has a higher viscosity to have higher adhesiveness, and thus is likely to increase the risk of accidental ingestion due to the adhesion of a food in the mouth or sticking in the throat.

The viscosity by using a Brookfield type viscometer can be determined by the analytical method for methyl cellulose in the Japanese Pharmacopoeia Sixteenth Edition.

The gelation temperature of methyl cellulose is evaluated by using the relation between a storage modulus G' (30 to 80° C.) and a loss modulus G". Generally, the loss modulus represents a viscous component in a solution, which is a component having such characteristics that a fluid is deformed by fluid movement to generate resistance, and is an index of gelation temperature.

The gelation temperature of a 2.0% by weight aqueous solution of the methyl cellulose is preferably 40 to 55° C., more preferably 40 to 50° C., even more preferably 40 to 45° C. When the gelation temperature is less than 40° C., such methyl cellulose has an excessively low dissolution temperature in water, and thus the methyl cellulose may not be dissolved and may fail to express sufficient viscosity. When the gelation temperature is more than 55° C., a food containing such methyl cellulose has low gel strength and may not sufficiently hold the food shape.

The gelation temperature of a 2.0% by weight aqueous solution of methyl cellulose may be determined with a rheometer such as MCR 502 manufactured by Anton Paar.

A 2.0% by weight aqueous solution of methyl cellulose may be prepared in the same method as the method for preparing the sample solution for the storage modulus G' (75° C.).

The temperature of the sample-measuring section of a rheometer is adjusted at 30° C. in advance; the 2.0% by weight aqueous solution of methyl cellulose is poured into a CC27 measurement cup, which is a cylindrical container having a diameter of 30 mm and a height of 80 mm, to a marked line (25 ml); and a distortion with a amplitude of 1% at the frequency of 1 Hz is applied to start the measurement. The temperature of the sample-measuring section is increased at a rate of 2° C./min to 80° C. Data are collected at two points per minute.

The storage modulus G' (30 to 80° C.) and the loss modulus G" determined by the measurement are variable as the temperature of a measurement system increases. The temperature at which the loss modulus G" is equal to the storage modulus G' (30 to 80° C.), in other words, the temperature at which G"/G' (30 to 80° C.) is 1, is regarded as the gelation temperature.

(2) Gelling Composition and Food Containing the Composition

The gelling composition can be added to a food such as a homogeneous jelly-like food, a mousse-like food, rice gruel, a paste-like soft food and a jellied food to hold the shape of the food at 75° C., which is the heating temperature before a meal is served, to prevent syneresis by heating, and to subsequently control the hardness, the adhesiveness and the cohesiveness (aggregability of the food) around 45° C. at which the food can be eaten in a warm state.

The gelling composition comprises the methyl cellulose, a low temperature gelling agent and a solvent.

The content of the methyl cellulose in the gelling composition is preferably 0.05 to 10% by weight from the standpoint of such hardness, adhesiveness or cohesiveness of a food as to be easily orally taken by people having difficulty in eating or swallowing.

The low temperature gelling agent gelates at a temperature lower than the gelation temperature of the methyl cellulose from the standpoint of shape retention properties of a food cooled in a temperature region lower than the gelation temperature of the methyl cellulose. The low temperature gelling agent preferably has a gelation temperature of 0 to 35° C. The low temperature gelling agent is exemplified by gelatin and polysaccharides. Examples of the polysaccharide include agar, carrageenan, gellan gum and native gellan gum, which gelate with a helical structure when a heated aqueous solution thereof is cooled; a combination of xanthan gum and a galactomannan (such as locust bean gum, glucomannan, Cassia gum and tara gum); psyllium seed gum; and curdlan. The polysaccharide may be used singly or in combination of two or more.

The content of the low temperature gelling agent in the gelling composition is preferably 0.05 to 30% by weight from the standpoint of such hardness, adhesiveness or cohesiveness of a food as to be easily orally taken by people having difficulty in eating or swallowing.

Examples of the solvent include ion-exchanged water, distilled water, tap water and buffers, and ice prepared from the solvent can also be used.

The content of the solvent in the gelling composition is preferably 1 to 99% by weight from the standpoint of such hardness, adhesiveness or cohesiveness of a food as to be easily orally taken by people having difficulty in eating or swallowing.

The gelling composition may further comprise an optional additive such as a saccharide, a sweetener, an organic acid, a thickener and a seasoning. The content of the additive varies depending on an application of the gelling composition, but is preferably 0.5 to 30% by weight from the standpoint of preventing the gelling composition, an ingredient or the like from precipitating during heating or from the standpoint of suppressing syneresis from a food.

Examples of the saccharide include, but not particularly limited to, glucose, fructose, sucrose, maltose, enzyme-saccharified starch syrup, lactose, saccharified reduced starch, isomerized sugar syrup, sucrose-binding starch syrup, oligosaccharide, reducing sugar, polydextrose, sorbitol, reducing lactose, trehalose, xylose, xylitol, maltitol, erythritol, mannitol, fructo-oligosaccharide, soybean oligosaccharide, galacto-oligosaccharide, lactosucrose, raffinose, lactulose and palatinose oligosaccharide. The saccharide may be used singly or in combination of two or more.

Examples of the sweetener include sucralose, acesulfame potassium, stevia and aspartame. The sweetener may be used singly or in combination of two or more.

Examples of the organic acid include citric acid, lactic acid, gluconic acid, malic acid, tartaric acid, fumaric acid, acetic acid, glacial acetic acid, phytic acid, adipic acid, succinic acid, glucono-δ-lactone, ascorbic acid, and various fruit juice such as citrus fruit juice. The organic acid may be used singly or in combination of two or more.

Examples of the thickener include, from the standpoint of preventing the gelling agent, an ingredient or the like from precipitating or separating during heating or from the standpoint of suppressing syneresis from a food, alginic acid, carboxymethyl cellulose, furcellaran, glucomannan, pectin, starch, processed starch, guar gum, fenugreek gum, cellulose, microfibrous cellulose, fermented cellulose, crystalline cellulose, konjak mannan, glucomannan, tamarind, soybean protein and dietary fiber. The thickener may be used singly or in combination of two or more.

Examples of the seasoning include glycine, sodium glutamate, amino acid seasonings, sodium chloride, and an organic acid such as acetic acid. The seasoning may be used singly or in combination of two or more.

Next, a method for producing the gelling composition will be described.

The method for producing a gelling composition includes a production method comprising the steps of: separately mixing each of the methyl cellulose and the low temperature gelling agent with a solvent and then combining each mixture, and a production method comprising the step of: simultaneously mixing the methyl cellulose and the low temperature gelling agent in a solvent.

The methyl cellulose dispersion may be prepared in the method comprising the steps of: pouring methyl cellulose into a jar containing hot water; and stirring the mixture with a stirrer at 350 to 450 rpm for 10 to 30 minutes while keeping the mixture at 90 to 100° C. to obtain a homogeneous dispersion.

The solution of a low temperature gelling agent may be prepared in the method comprising the steps of: pouring a low temperature gelling agent into a jar containing water or hot water; then stirring the mixture with a stirrer while keeping the mixture at 90 to 100° C. to obtain a homogeneous dispersion; and further stirring the dispersion at 350 to 450 rpm for 30 to 60 minutes until the low temperature gelling agent is dissolved. The water in which the low temperature gelling agent will be dispersed may have any temperature as long as the low temperature gelling agent is heated from a room temperature of 25° C. to a temperature higher than the temperature at which the low temperature gelling agent is dissolved.

Then, the methyl cellulose dispersion maintained at 90 to 100° C. and the low temperature gelling agent solution are mixed with a stirrer to obtain a gelling composition.

The production method of simultaneously mixing the methyl cellulose and the low temperature gelling agent in a solvent comprises the steps of: simultaneously pouring the methyl cellulose and the low temperature gelling agent in a jar containing water or hot water, and stirring the mixture with a stirrer at 350 to 450 rpm for 30 to 60 minutes, while keeping the mixture at 90 to 100° C., to obtain a homogeneous dispersion liquid. During the stirring, the viscosity of the gelling composition is measured to determine whether the low temperature gelling agent is dissolved.

Next, the food comprising the gelling composition will be described.

The food comprising the gelling composition is not particularly limited. The food may be prepared by adding an additive to the gelling composition or by mixing the gelling composition with one or more ingredients selected from vegetables, meats and fish. The content of the gelling composition in a food is preferably 1 to 70% by weight.

A food comprising the gelling composition, including homogeneous jelly-like foods, mousse-like foods, rice gruel, paste-like soft foods and jellied foods, may be produced in a method comprising the steps of: processing one or more ingredients with a mixer, a mill, a juicer, a food processor or the like to obtain a liquid or a powder; mixing the liquid or the powder with the gelling composition by using a mixing device; then packing the resulting mixture in an appropriate container; and cooling the packed mixture to obtain a food. To allow the gelling composition to sufficiently gelate, it is preferred to cool the mixture to a temperature not higher than the gelation temperature of the low temperature gelling agent and then to allow the mixture to stand preferably for 1 to 24 hours.

The ingredient such as vegetables, meats and fish is subjected to heat sterilization treatment in advance. The heat sterilization treatment is performed preferably at 70 to 180° C. by UHT (ultra-high temperature), HTST (high temperature short time), LTLT (low temperature long time), a direct-heating method such as an injection method and an infusion method, or an indirect heating method such as a scraping method.

Examples of the mixing device to be used include a hand mixer, a homogenizer, a colloid mill, a static mixer, an in-line mixer, and a disper mill. A home hand mixer is used, for example, at a rotation rate of 500 to 1,500 rpm for 20 seconds. Since a mixture becomes inhomogeneous at a temperature not higher than the gelation temperature of the low temperature gelling agent during mixing, heating is carried out during mixing as needed. Specifically, since gellan gum starts to gelate at a temperature not higher than 60 to 70° C. to partly form inhomogeneous lumps, it is preferably mixed while being heated at 80° C. or more.

Regarding the production of a jellied food, since an original ingredient is once deformed by a mixer or the like, unlike common foods, the deformed ingredient may be packed in an appropriate container (mold) being made of silicone, metal or the like and having a shape of a vegetable, meat, fish or the like, to have a similar appearance to that of the ingredient.

Examples of the cooling method include radiational cooling or refrigerator cooling after a food is packed in an appropriate container, and cooling with a rapid cooling plasticizer such as "Perfector" and "Kombinator" before a food is packed.

The hardness, the adhesiveness and the cohesiveness of the obtained gelation product or a food containing the gelation product may be determined by using a texture analyzer. The hardness determined by a texture analyzer is an index of the hardness of a gelation product or a food containing the gelation product. The adhesiveness determined by a texture analyzer is an index of the stickiness of a gelation product or a food containing the gelation product. Generally, the adhesiveness increases as the viscosity increases. A food having a higher viscosity causes an increase in swallowing pressure and an increase in activity of the esophageal smooth muscle for people having difficulty in eating or swallowing, thereby increasing a burden in eating. On this account, increases in viscosity and adhesiveness are unfavorable. When a food has a high adhesiveness, a lump of the food may stick in the mouth. The cohesiveness determined by a texture analyzer is an index of aggregability of a gelation product or a food containing the gelation product during chewing. A food having a low cohesiveness is unlikely to aggregate during chewing and thus puts a burden on swallowing.

Examples of the texture analyzer include TA-XTplus manufactured by EKO Instruments, and a compact tabletop analyzer EZ TEST manufactured by Shimadzu Corporation.

Regarding physical properties of a food suited for people having difficulty in eating or swallowing, the Licensing Standard for Food for Special Dietary Uses is issued by the Ministry of Health, Labor and Welfare, Japan, and is classified into licensing standards I to III. Specifically, with respect to homogeneous jelly-like foods, the hardness is defined as 2,500 to 10,000 N/m$^2$, the adhesiveness is defined as 400 J/m$^3$ or less, and the cohesiveness is defined as 0.2 to 0.6, as the licensing standard I. With respect to homogeneous jelly-like foods and mousse-like foods, the hardness is defined as 1,000 to 15,000 N/m$^2$, the adhesiveness is defined as 1,000 J/m$^3$ or less, and the cohesiveness is defined as 0.2 to 0.9, as the licensing standard II. With respect to inhomogeneous foods such as easily aggregated rice gruel, soft paste-like foods, and jellied foods, the hardness is defined as 300 to 20,000 N/m$^2$, the adhesiveness is defined as 1,500 J/m$^3$ or less, and the cohesiveness is not defined, as the licensing standard III.

The syneresis during heating is evaluated by an amount of water separated from a gelling composition or a food containing the gelling composition, or an amount of oil and fat component or the like separated from the ingredient when a food is heated so as to allow a core of the food to have a core temperature of 75° C. People having difficulty in eating or swallowing are unlikely to cause swallowing reflex to a low viscosity liquid such as water, so that they accidentally aspirate water or a food from the bronchial tubes into the lungs, causing a serious disease including pneumonia. To suppress such accidental ingestion, the amount of liquid separated is preferably 0 to 0.5 g, more preferably 0 to 0.1 g.

The gelling composition and the food containing the gelling composition are not particularly limited, and are, prior to serving, subjected to heat treatment such as baking, frying or steaming by using a microwave oven, a gas range, an oven or a dryer so that the core temperature of the food is maintained preferably at 75° C. or higher for 10 minutes or more. The core temperature in the heat treatment is more preferably 75 to 90° C., even more preferably 75 to 80° C.

EXAMPLES

The invention will be described further in detail with reference to Synthesis Examples and Comparative Synthesis Examples of methyl cellulose as well as Examples and Comparative Examples. It should not be construed that the invention is limited to or by Synthesis Examples and Examples.

Synthesis Example 1

A wood pulp having an intrinsic viscosity of 800 ml/g was pulverized with a pulverizer to obtain a cellulose pulp powder. The cellulose pulp powder in an amount corresponding to 6.0 kg of cellulose was placed in an internal-stirring pressure-resistant reactor with a jacket. Nitrogen substitution after vacuum evacuation was carried out to thoroughly remove oxygen in the reactor.

Next, a 49% by weight aqueous sodium hydroxide solution as a first alkali metal hydroxide solution in such an amount to make a mole ratio of the first sodium hydroxide to the cellulose (first sodium hydroxide/cellulose) to be 2.62 was added to the reactor with stirring at an addition rate of 10.48 [mol/mol·hr], while adjusting the inside temperature of the reactor at 60° C., to obtain alkali cellulose.

Subsequently, 2.4 kg of dimethyl ether was added thereto, while adjusting the inside temperature of the reactor at 60° C. After the addition of dimethyl ether, while increasing the inside temperature of the reactor from 60° C. to 80° C., methyl chloride in such an amount to make a mole ratio of the methyl chloride to the total amount of the first and second sodium hydroxides (methyl chloride/total sodium hydroxide) to be 1.1 was added thereto over 60 minutes to obtain a first reaction mixture. Subsequently to the addition of methyl chloride, a 49% by weight aqueous sodium hydroxide solution as a second alkali metal hydroxide solution in such an amount to make a mole ratio of the second sodium hydroxide to the cellulose (second sodium hydroxide/cellulose) to be 1.60 was added thereto at an addition rate of 3.20 [mol/mol·hr] to obtain a second reaction mixture. The inside temperature of the reactor was 77° C. at the start of the addition of the second sodium hydroxide solution and 89° C. at the completion of the addition thereof. The inside temperature of the reactor was increased at 24° C./hr from the start to the completion of the addition of the second aqueous sodium hydroxide solution. After the completion of the addition of the second aqueous sodium hydroxide solution, the stirring was continued for 30 minutes to complete the etherification. The ratio of the weight of the first sodium hydroxide in the first aqueous sodium hydroxide solution to the total weight of the first and second sodium hydroxides in the first and second aqueous sodium hydroxide solutions was 62.1%.

The obtained second reaction mixture was made into a slurry by addition of hot water of 95° C., then washed with a rotary pressure filter, and dried with an air dryer. The dried product was pulverized with a ball mill and classified through a sieve to obtain methyl cellulose. The experimental conditions are shown in Table 1.

The obtained methyl cellulose had a DS of 1.81, and the viscosity at 20° C. of a 2.0% by weight aqueous solution of the methyl cellulose determined with a Brookfield type viscometer was 4,500 mPa·s. The storage modulus G' (75° C.) at 75° C. of a 2.0% by weight aqueous solution of the methyl cellulose was determined to be 4,500 Pa, the return temperature storage modulus G' (75 to 45° C.) of the 2.0% by weight aqueous solution of the methyl cellulose when the temperature was returned from 75° C. to 45° C. was determined to be 2,750 Pa, and the gelation temperature was 43° C. The obtained results are shown in Table 1.

Synthesis Example 2

Methyl cellulose was obtained in the same manner as in Synthesis Example 1 except that a cellulose pulp powder obtained by pulverizing a wood pulp having an intrinsic viscosity of 850 ml/g with a pulverizer was used.

The obtained methyl cellulose had a DS of 1.81, and the viscosity at 20° C. of a 2.0% by weight aqueous solution of the methyl cellulose determined with a Brookfield type viscometer was 5,800 mPa·s. The storage modulus G' (75° C.) at 75° C. of a 2.0% by weight aqueous solution of the methyl cellulose was determined to be 4,750 Pa, the return temperature storage modulus G' (75 to 45° C.) of the 2.0% by weight aqueous solution of the methyl cellulose when the temperature was returned from 75° C. to 45° C. was determined to be 2,950 Pa, and the gelation temperature was 42° C. The obtained results are shown in Table 1.

Synthesis Example 3

Methyl cellulose was obtained in the same manner as in Synthesis Example 1 except that a cellulose pulp powder obtained by pulverizing a wood pulp having an intrinsic viscosity of 900 ml/g with a pulverizer was used.

The obtained methyl cellulose had a DS of 1.82, and the viscosity at 20° C. of a 2.0% by weight aqueous solution of the methyl cellulose determined with a Brookfield type viscometer was 7,000 mPa·s. The storage modulus G' (75° C.) at 75° C. of a 2.0% by weight aqueous solution of the methyl cellulose was determined to be 5,010 Pa, the return temperature storage modulus G' (75 to 45° C.) of the 2.0% by weight aqueous solution of the methyl cellulose when the temperature was returned from 75° C. to 45° C. was determined to be 2,900 Pa, and the gelation temperature was 41° C. The obtained results are shown in Table 1.

Synthesis Example 4

Methyl cellulose was obtained in the same manner as in Synthesis Example 1 except that a cellulose pulp powder obtained by pulverizing a wood pulp having an intrinsic viscosity of 1,000 ml/g with a pulverizer was used.

The obtained methyl cellulose had a DS of 1.82, and the viscosity at 20° C. of a 2.0% by weight aqueous solution of the methyl cellulose determined with a Brookfield type viscometer was 7,800 mPa·s.

The storage modulus G' (75° C.) at 75° C. of a 2.0% by weight aqueous solution of the methyl cellulose was determined to be 5,200 Pa, the return temperature storage modulus G' (75 to 45° C.) of the 2.0% by weight aqueous solution of the methyl cellulose when the temperature was returned from 75° C. to 45° C. was determined to be 3,150 Pa, and the gelation temperature was 45° C. The obtained results are shown in Table 1.

Synthesis Example 5

Methyl cellulose was obtained in the same procedure as in Synthesis Example 1 except that a cellulose pulp powder obtained by pulverizing a wood pulp having an intrinsic viscosity of 1,200 ml/g with a pulverizer was used.

The obtained methyl cellulose had a DS of 1.83, and the viscosity at 20° C. of a 2.0% by weight aqueous solution of the methyl cellulose determined with a Brookfield type viscometer was 9,500 mPa·s.

The storage modulus G' (75° C.) at 75° C. of a 2.0% by weight aqueous solution of the methyl cellulose was determined to be 5,400 Pa, the return temperature storage modulus G' (75 to 45° C.) of the 2.0% by weight aqueous solution of the methyl cellulose ether when the temperature was returned from 75° C. to 45° C. was determined to be 3,300 Pa, and the gelation temperature was 48° C. The obtained results are shown in Table 1.

Synthesis Example 6

A cellulose pulp powder was placed in a reactor in the same manner as in Synthesis Example 1. A 49% by weight aqueous sodium hydroxide solution as the first alkali metal hydroxide solution in such an amount to make a weight ratio of the first sodium hydroxide to the cellulose (first sodium hydroxide/cellulose) to be 3.01 was added to the reactor with stirring at an addition rate of 12.04 [mol/mol·hr], while adjusting the inside temperature of the reactor at 55° C., to obtain alkali cellulose.

Subsequently, a first reaction mixture was obtained in the same manner as in Synthesis Example 1. Next, a second reaction mixture was obtained in the same manner as in Synthesis Example 1 except that the inside temperature of the reactor was 81° C. at the start of the addition of the second aqueous sodium hydroxide solution and 89° C. at the completion of the addition, the inside temperature of the reactor was increased at 16.4° C./hr from the start of the addition of the second aqueous sodium hydroxide solution to the completion of the addition, and the second aqueous sodium hydroxide solution in such an amount to make a mole ratio of the second sodium hydroxide to the cellulose (second sodium hydroxide/cellulose) to be 1.26 was added at an addition rate of 2.58 [mol/mol·hr]. The ratio of the weight of the first sodium hydroxide in the first aqueous sodium hydroxide solution to the total weight of the first and second sodium hydroxides in the first and second aqueous sodium hydroxide solutions was 70.5%.

The obtained second reaction mixture was then purified and pulverized in the same manner as in Synthesis Example 1 to obtain methyl cellulose. The experimental conditions are shown in Table 1.

The obtained methyl cellulose had a DS of 1.85, and the viscosity at 20° C. of a 2.0% by weight aqueous solution of the methyl cellulose determined with a Brookfield type viscometer was 4,200 mPa·s. The storage modulus $G'$ (75° C.) at 75° C. of a 2.0% by weight aqueous solution of the methyl cellulose was determined to be 4,150 Pa, the return temperature storage modulus $G'$ (75 to 45° C.) of the 2.0% by weight aqueous solution of the methyl cellulose when the temperature was returned from 75° C. to 45° C. was determined to be 2,600 Pa, and the gelation temperature was 42° C. The obtained results are shown in Table 1.

Synthesis Example 7

A cellulose pulp was placed in a reactor in the same manner as in Synthesis Example 1. A 49% by weight aqueous sodium hydroxide solution as the first alkali metal hydroxide solution in such an amount to make a weight ratio of the first sodium hydroxide to the cellulose (first sodium hydroxide/cellulose) to be 2.85 was added to the reactor with stirring at an addition rate of 11.39 [mol/mol·hr], while adjusting the inside temperature of the reactor at 55° C., to obtain alkali cellulose.

Subsequently, a first reaction mixture was obtained in the same manner as in Synthesis Example 1. Next, a second reaction mixture was obtained in the same manner as in Synthesis Example 1 except that the inside temperature of the reactor was 79° C. at the start of the addition of the second aqueous sodium hydroxide solution and 91° C. at the completion of the addition, the inside temperature of the reactor was increased at 24° C./hr from the start of the addition of the second aqueous sodium hydroxide solution to the completion of the addition, and the second aqueous sodium hydroxide solution in such an amount to make a mole ratio of the second sodium hydroxide to the cellulose (second sodium hydroxide/cellulose) to be 1.40 was added to the reactor with stirring at an addition rate of 2.80 [mol/mol·hr]. The ratio of the weight of the first sodium hydroxide in the first aqueous sodium hydroxide solution to the total weight of the first and second sodium hydroxides in the first and second aqueous sodium hydroxide solutions was 67.0%.

The obtained second reaction mixture was then purified and pulverized in the same manner as in Synthesis Example 1 to obtain a methyl cellulose. The experimental conditions are shown in Table 1.

The obtained methyl cellulose had a DS of 1.82, and the viscosity at 20° C. of a 2.0% by weight aqueous solution of the methyl cellulose determined with a Brookfield type viscometer was 3,200 mPa·s. The storage modulus $G'$ (75° C.) at 75° C. of a 2.0% by weight aqueous solution of the methyl cellulose was determined to be 3,400 Pa, the return temperature storage modulus $G'$ (75 to 45° C.) of the 2.0% by weight aqueous solution of the methyl cellulose when the temperature was returned from 75° C. to 45° C. was determined to be 2,550 Pa, and the gelation temperature was 42° C. The obtained results are shown in Table 1.

Synthesis Example 8

A cellulose pulp powder was placed in a reactor in the same manner as in Synthesis Example 1 except that the cellulose pulp powder had been prepared by pulverizing a wood pulp having an intrinsic viscosity of 600 ml/g with a pulverizer. A 49% by weight aqueous sodium hydroxide solution as a first alkali metal hydroxide solution in such an amount to make a mole ratio of the first sodium hydroxide to the cellulose (first sodium hydroxide/cellulose) to be 2.26 was added to the reactor with stirring at an addition rate of 9.04 [mol/mol·hr], while adjusting the inside temperature of the reactor at 55° C., to obtain alkali cellulose.

Subsequently, a first reaction mixture was obtained in the same manner as in Synthesis Example 1. Next, a second reaction mixture was obtained in the same manner as in Synthesis Example 1 except that the inside temperature of the reactor was 80° C. at the start of the addition of the second sodium hydroxide solution and 92° C. at the completion of the addition, the inside temperature of the reactor was increased at 36° C./hr from the start of the addition of the second aqueous sodium hydroxide solution to the completion of the addition, and the second aqueous sodium hydroxide solution in such an amount to make a mole ratio of the second sodium hydroxide to the cellulose (second sodium hydroxide/cellulose) to be 1.84 was added to the reactor at an addition rate of 5.52 [mol/mol·hr]. The ratio of the weight of the first sodium hydroxide in the first aqueous sodium hydroxide solution to the total weight of the first and second sodium hydroxides in the first and second aqueous sodium hydroxide solutions was 55.1%.

The obtained second reaction mixture was then purified and pulverized in the same manner as in Synthesis Example 1 to obtain methyl cellulose. The experimental conditions are shown in Table 1.

The obtained methyl cellulose had a DS of 1.85, and the viscosity at 20° C. of a 2.0% by weight aqueous solution of the methyl cellulose determined with a Brookfield type viscometer was 3,100 mPa·s. The storage modulus $G'$ (75° C.) at 75° C. of a 2.0% by weight aqueous solution of the methyl cellulose was determined to be 3,200 Pa, the return temperature storage modulus $G'$ (75 to 45° C.) of the 2.0% by weight aqueous solution of the methyl cellulose when the temperature was returned from 75° C. to 45° C. was determined to be 2,400 Pa, and the gelation temperature was 40° C. The obtained results are shown in Table 1.

Comparative Synthesis Example 1

A cellulose pulp powder was placed in a reactor in the same manner as in Synthesis Example 1. A 49% by weight aqueous sodium hydroxide solution as a first alkali metal hydroxide solution in such an amount to make a mole ratio of the first sodium hydroxide to the cellulose (first sodium hydroxide/cellulose) to be 1.97 was added to the reactor with stirring at an addition rate of 7.88 [mol/mol·hr], while adjusting the inside temperature of the reactor at 40° C. After the completion of the addition, the stirring was continued for another 10 minutes.

Subsequently, 2.4 kg of dimethyl ether was added thereto, while adjusting the inside temperature of the reactor at 40° C. After the addition of dimethyl ether, methyl chloride was divided and added in two stages similarly to the addition of the sodium hydroxide solution. The first methyl chloride in such an amount to make a mole ratio of the first methyl chloride to the first sodium hydroxide (first methyl chloride/first sodium hydroxide) to be 1.1 was added over 25 minutes to obtain a first reaction mixture. After the completion of the addition of the first methyl chloride, the inside temperature of the reactor was increased from 40° C. to 80° C. over 40 minutes. After the temperature reached 80° C., the mixing with stirring was continued for another 30 minutes.

Subsequently, a 49% by weight aqueous sodium hydroxide solution as a second alkali metal hydroxide solution in such an amount to make a mole ratio of the second sodium hydroxide to the cellulose (second sodium hydroxide/cellulose) to be 2.55 was added to the reactor at an addition rate of 15.31 [mol/mol·hr], while adjusting the inside temperature of the reactor at 80° C., to obtain a second reaction mixture. The inside temperature of the reactor was 80° C. during the addition of the second aqueous sodium hydroxide solution and also 80° C. at the completion of the addition. The ratio of the weight of the first sodium hydroxide in the first aqueous sodium hydroxide solution to the total weight of the first and second sodium hydroxides in the first and second aqueous sodium hydroxide solutions was 43.6%.

Subsequently, the second methyl chloride in such an amount to make a mole ratio of the second methyl chloride to the second sodium hydroxide (second methyl chloride/second sodium hydroxide) to be 1.1 was added to the reactor over 30 minutes while adjusting the inside temperature of the reactor at 80° C. After the addition of the second methyl chloride, the mixing with stirring was continued for another 30 minutes while maintaining the inside temperature of the reactor at 80° C. The inside temperature of the reactor was then increased from 80° C. to 95° C. over 15 minutes to obtain crude methyl cellulose.

The obtained crude methyl cellulose was then purified and pulverized in the same manner as in Synthesis Example 1 to obtain methyl cellulose.

The obtained methyl cellulose had a DS of 1.85, and the viscosity at 20° C. of a 2.0% by weight aqueous solution of the methyl cellulose determined with a Brookfield type viscometer was 5,000 mPa·s. The storage modulus G' (75° C.) at 75° C. of a 2.0% by weight aqueous solution of the methyl cellulose was determined to be 5,100 Pa, the return temperature storage modulus G' (75 to 45° C.) of the 2.0% by weight aqueous solution of the methyl cellulose when the temperature was returned from 75° C. to 45° C. was determined to be 3,850 Pa, and the gelation temperature was 34° C. The obtained results are shown in Table 1.

Comparative Synthesis Example 2

A cellulose pulp powder was placed in a reactor in the same manner as in Synthesis Example 4. A 49% by weight aqueous sodium hydroxide solution as a first alkali metal hydroxide solution in such an amount to make a mole ratio of the first sodium hydroxide to the cellulose (first sodium hydroxide/cellulose) to be 4.11 was added to the reactor with stirring at an addition rate of 16.44 [mol/mol·hr], while adjusting the inside temperature of the reactor at 60° C., to obtain alkali cellulose.

Subsequently, a first reaction mixture was obtained in the same manner as in Synthesis Example 4. Next, a second reaction mixture was obtained in the same manner as in Synthesis Example 1 except that the inside temperature of the reactor was 80° C. at the start of the addition of the second aqueous sodium hydroxide solution and 91° C. at the completion of the addition, the inside temperature of the reactor was increased at 22° C./hr from the start of the addition of the second aqueous sodium hydroxide solution to the completion of the addition, and the second aqueous sodium hydroxide solution in such an amount to make a mole ratio of the second sodium hydroxide to the cellulose (second sodium hydroxide/cellulose) to be 0.46 was added to the reactor at an addition rate of 0.92 [mol/mol·hr]. The ratio of the weight of the first sodium hydroxide in the first aqueous sodium hydroxide solution to the total weight of the first and second sodium hydroxides in the first and second aqueous sodium hydroxide solutions was 89.9%.

The obtained second reaction mixture was then purified and pulverized in the same manner as in Synthesis Example 1 to obtain methyl cellulose. The experimental conditions are shown in Table 1.

The obtained methyl cellulose had a DS of 1.82, and the viscosity at 20° C. of a 2.0% by weight aqueous solution of the methyl cellulose determined with a Brookfield type viscometer was 4,000 mPa·s. The storage modulus G' (75° C.) at 75° C. of a 2.0% by weight aqueous solution of the methyl cellulose was determined to be 2,500 Pa, the return temperature storage modulus G' (75 to 45° C.) of the 2.0% by weight aqueous solution of the methyl cellulose when the temperature was returned from 75° C. to 45° C. was determined to be 1,100 Pa, and the gelation temperature was 62° C. The obtained results are shown in Table 1.

Comparative Synthesis Example 3

Methyl cellulose was obtained in the same manner as in Comparative Synthesis Example 2 except that a cellulose pulp powder obtained by pulverizing a wood pulp having an intrinsic viscosity of 1,400 ml/g with a pulverizer was used.

The obtained methyl cellulose had a DS of 1.82, and the viscosity at 20° C. of a 2.0% by weight aqueous solution of the methyl cellulose determined with a Brookfield type viscometer was 12,000 mPa·s. The storage modulus G' (75° C.) at 75° C. of a 2.0% by weight aqueous solution of the methyl cellulose was determined to be 2,700 Pa, the return temperature storage modulus G' (75 to 45° C.) of the 2.0% by weight aqueous solution when the temperature was returned from 75° C. to 45° C. was determined to be 1,300 Pa, and the gelation temperature was 64° C. The obtained results are shown in Table 1.

TABLE 1

| | production conditions | | | | | | | | properties | | | |
|---|---|---|---|---|---|---|---|---|---|---|---|---|
| | | first NaOH | | | second NaOH | | | | | viscosity | storage | |
| | addition of methyl chloride | weight ratio (%) to total of first and second NaOH | mole ratio to cellulose | addition rate to cellulose (mol/ mol · hr) | mole ratio to cellulose | addition rate to cellulose (mol/ mol · hr) | inside temp. of reactor at start of addition (° C.) | temp. increase rate (° C./hr) | degree of substitution of methoxy (DS) | of 2 wt % aq. solution by Brookfield type viscometer (mPa · s) | storage modulus G'(75° C.) of 2 wt % aqueous solution (Pa) | storage modulus G'(75 to 45° C.) of 2 wt % aqueous solution (Pa) | gelation temp. of 2 wt % aqueous solution (° C.) |
| Syn. Ex. 1 | once | 62.1 | 2.62 | 10.48 | 1.6 | 3.2 | 77 | 24 | 1.81 | 4500 | 4500 | 2750 | 43 |
| Syn. Ex. 2 | once | 62.1 | 2.62 | 10.48 | 1.6 | 3.2 | 77 | 24 | 1.81 | 5800 | 4750 | 2950 | 42 |
| Syn. Ex. 3 | once | 62.1 | 2.62 | 10.48 | 1.6 | 3.2 | 77 | 24 | 1.82 | 7000 | 5010 | 2900 | 41 |
| Syn. Ex. 4 | once | 62.1 | 2.62 | 10.48 | 1.6 | 3.2 | 77 | 24 | 1.82 | 7800 | 5200 | 3150 | 45 |
| Syn. Ex. 5 | once | 62.1 | 2.62 | 10.48 | 1.6 | 3.2 | 77 | 24 | 1.83 | 9500 | 5400 | 3300 | 48 |
| Syn. Ex. 6 | once | 70.5 | 3.01 | 12.04 | 1.26 | 2.58 | 81 | 16.4 | 1.85 | 4200 | 4150 | 2600 | 42 |
| Syn. Ex. 7 | once | 67.0 | 2.85 | 11.39 | 1.4 | 2.8 | 79 | 24 | 1.82 | 3200 | 3400 | 2550 | 42 |
| Syn. Ex. 8 | once | 55.1 | 2.26 | 9.04 | 1.84 | 5.52 | 80 | 36 | 1.85 | 3100 | 3200 | 2400 | 40 |
| Comp. Syn. Ex. 1 | twice | 43.6 | 1.97 | 7.88 | 2.55 | 15.31 | 80 | 0 | 1.85 | 5000 | 5100 | 3850 | 34 |
| Comp. Syn. Ex. 2 | once | 89.9 | 4.11 | 16.44 | 0.46 | 0.92 | 80 | 22 | 1.82 | 4000 | 2500 | 1100 | 62 |
| Comp. Syn. Ex. 3 | once | 89.9 | 4.11 | 16.44 | 0.46 | 0.92 | 80 | 22 | 1.82 | 12000 | 2700 | 1300 | 64 |

Example 1

With a bath stirrer (EWS-100RD manufactured by As One Corporation), 100 g of water in a 100-mL beaker was adjusted at 95° C. While the water was stirred at 500 rpm with a stirrer (NZ-1000 manufactured by TOKYO RIKAK-IKAI), 1 g of gellan gum (manufactured by DSP GOKYO FOOD & CHEMICAL) as a low temperature gelling agent and 1 g of the methyl cellulose produced in Synthesis Example 1 were added to the water, and the whole was stirred for 60 minutes. The solution in which the low temperature gelling agent and the methyl cellulose were mixed was poured into a cylindrical stainless steel container up to a height of 15 mm of the container, wherein the container had a diameter of 40 mm and a height of 20 mm. The poured solution was allowed to stand in a refrigerator at 10° C. for 2 hours to obtain a gelation product. The obtained gelation product was subjected to the following quantitative evaluation of hardness, adhesiveness and cohesiveness with a texture analyzer and subjected to the sensory evaluation by 10 evaluators of shape retention properties, stickiness during chewing, and chewing properties. Syneresis properties were evaluated at two core temperatures of the gelation product: 75° C. by heating the gelation product and 45° C. after cooling the core temperature of 75° C. to 45° C. by leaving the gelation product having the core temperature of 75° C. in an environment of room temperature, where the gelation product in the stainless steel container was tilted to obtain an eluted solution, and the eluted solution was transferred to a petri dish and weighed for evaluation. The results are shown in Table 2.

<Quantitative Evaluation with Texture Analyzer: Hardness, Adhesiveness, Cohesiveness>

A texture analyzer, TA-XTplus (manufactured by EKO Instruments) was used to determine the hardness, adhesiveness and cohesiveness of the gelation product in the stainless steel container. Specifically, the measurement was carried out at two core temperatures of the gelation product: 75° C. by heating the gelation product, and 45° C. after cooling the core temperature of 75° C. to 45° C. by leaving the gelation product having the core temperature of 75° C. in an environment of room temperature. An air of 120° C. from an air dryer was blown to heat the gelation product in the stainless steel container for 10 minutes to increase the core temperature of the gelation product to 75° C. The gelation product having a core temperature of 75° C. was found to be a hardness of 8,900 N/m$^2$, an adhesiveness of 150 J/m$^3$ and a cohesiveness of 0.86. The gelation product was not deformed and had good shape retention properties. When the gelation product in the stainless steel container was tilted, the amount of the eluted solution (i.e. syneresis properties at 75° C.) was 0.05 g.

The gelation product having a core temperature of 45° C. was found to have a hardness of 5,600 N/m$^2$, an adhesiveness of 160 J/m$^3$ and a cohesiveness of 0.88. The gelation product was not deformed and had good shape retention properties. When the gelation product in the stainless steel container was tilted, the amount of the eluted solution (i.e. syneresis properties at 45° C.) was 0 g so that no liquid separation was observed.

The measurement conditions of the texture analyzer are as follows:

Measuring equipment: texture analyzer, TA-XTplus (manufactured by EKO Instruments)

Measurement instrument: a circular resin probe (P/20 type) having a diameter of 20 mm and a height of 8 mm Measurement mode: compression test (twice compression)

Test speed: 10 mm/sec

Clearance: 5 mm

<Sensory Evaluation by 10 Evaluators: Shape Retention Properties, Stickiness During Chewing, and Chewing Properties>

In addition to the evaluation with a texture analyzer, the obtained gelation product and a gelation food were also subjected to sensory evaluation by 10 evaluators.

The shape retention properties of the gelling composition were evaluated by 10 evaluators who observed visually and touched directly and manually the obtained gelation product. The stickiness during chewing and the chewing properties of the gelation product were evaluated by 10 evaluators who chewed the obtained gelation product. The stickiness during chewing was determined whether the stickiness to the inside of the mouth was sensed during chewing. The chewing properties were determined whether elasticity was sensed during chewing and whether several chewing strokes were required for swallowing.

Each evaluation was classified into three ranks: A, B and F, and the evaluation criteria are as shown below.

A: Eight or more evaluators evaluated a product as good.
B: Five or more but less than eight evaluators evaluated a product as good.
F: Less than five evaluators evaluated a product as good.

Example 2

A gelation product was obtained in the same manner as in Example 1 except that the methyl cellulose produced in Synthesis Example 2 was used. In the same manner as in Example 1, various properties of the obtained gelation product were determined with a texture analyzer at various temperatures, the sensory evaluation was performed by 10 evaluators, and the syneresis properties were evaluated. The results are shown in Table 2.

Example 3

A gelation product was obtained in the same manner as in Example 1 except that the methyl cellulose produced in Synthesis Example 3 was used. In the same manner as in Example 1, various properties of the obtained gelation product were determined with a texture analyzer at various temperatures, the sensory evaluation was performed by 10 evaluators, and the syneresis properties were evaluated. The results are shown in Table 2.

Example 4

A gelation product was obtained in the same manner as in Example 1 except that the methyl cellulose produced in Synthesis Example 4 was used. In the same manner as in Example 1, various properties of the obtained gelation product were determined with a texture analyzer at various temperatures, the sensory evaluation was performed by 10 evaluators, and the syneresis properties were evaluated. The results are shown in Table 2.

Example 5

A gelation product was obtained in the same manner as in Example 1 except that the methyl cellulose produced in Synthesis Example 5 and agar (Ultra Agar for nursing meal manufactured by Ina Food Industry) as the low temperature gelling agent were used. In the same manner as in Example 1, various properties of the obtained gelation product were determined with a texture analyzer at various temperatures, the sensory evaluation was performed by 10 evaluators, and the syneresis properties were evaluated. The results are shown in Table 2.

Example 6

A gelation product was obtained in the same manner as in Example 1 except that the methyl cellulose produced in Synthesis Example 6 and agar (Ultra Agar for nursing meal manufactured by Ina Food Industry) as the low temperature gelling agent were used. In the same manner as in Example 1, various properties of the obtained gelation product were determined with a texture analyzer at various temperatures, the sensory evaluation was performed by 10 evaluators, and the syneresis properties were evaluated. The results are shown in Table 2.

Example 7

A gelation product was obtained in the same manner as in Example 1 except that the methyl cellulose produced in Synthesis Example 7 and gelatin (manufactured by Wako Pure Chemical Industries, Ltd., a gel strength of 240 to 280 $g/cm^2$) as the low temperature gelling agent were used. In the same manner as in Example 1, various properties of the obtained gelation product were determined with a texture analyzer at various temperatures, the sensory evaluation was performed by 10 evaluators, and the syneresis properties were evaluated. The results are shown in Table 2.

Example 8

A gelation product was obtained in the same manner as in Example 1 except that the methyl cellulose produced in Synthesis Example 8 and gelatin (manufactured by Wako Pure Chemical Industries, Ltd., a gel strength of 240 to 280 $g/cm^2$) as the low temperature gelling agent were used. In the same manner as in Example 1, various properties of the obtained gelation product were determined with a texture analyzer at various temperatures, the sensory evaluation was performed by 10 evaluators, and the syneresis properties were evaluated. The results are shown in Table 2.

Example 9

The gelling composition prepared in Example 1, which was prior to gelation of the low temperature gelling agent in a refrigerator, was mixed at 95° C. with a solution prepared by grinding cooked spinach with a mixer until disappearance of solid content, at a weight ratio of 1:1. The mixed solution was poured into a silicone mold, then molded, and allowed to stand in a refrigerator at 10° C. for 2 hours, to obtain a vegetable-shaped gelation product (i.e. a gelation food). The gelation food was taken out of the mold. In the same manner as in Example 1, various properties of the gelation product were determined with a texture analyzer at various temperatures, the sensory evaluation was performed by 10 evaluators, and the syneresis properties were evaluated. The results are shown in Table 2.

Example 10

A meat-shaped gelation product (i.e. a gelation food) was obtained in the same manner as in Example 9 except that corn beef was used in the place of the cooked spinach in Example 9. The gelation food was taken out of the mold. In the same manner as in Example 1, various properties of the gelation product were determined with a texture analyzer at various temperatures, the sensory evaluation was performed by 10 evaluators, and the syneresis properties were evaluated. The results are shown in Table 2.

Example 11

A fish-shaped gelation product (i.e. a gelation food) was obtained in the same manner as in Example 9 except that boiled mackerel was used in the place of the cooked spinach in Example 9. The gelation food was taken out of the mold. In the same manner as in Example 1, various properties of the gelation product were determined with a texture analyzer at various temperatures, the sensory evaluation was performed by 10 evaluators, and the syneresis properties were evaluated. The results are shown in Table 2.

Comparative Example 1

A gelation product was obtained in the same manner as in Example 1 except that the methyl cellulose produced in Comparative Synthesis Example 1 was used. In the same manner as in Example 1, various properties of the obtained gelation product were determined with a texture analyzer at various temperatures, the sensory evaluation was performed by 10 evaluators, and the syneresis properties were evaluated. The results are shown in Table 2.

Regarding various properties of the gelation product obtained in Comparative Example 1, a storage modulus G' (75 to 45° C.) was 3,850 Pa, which is larger than those obtained in accordance with the invention. On this account, the gelation product having a core temperature of 45° C. had a higher hardness and a higher cohesiveness so that chewing properties became poor. The product failed to satisfy the requirements of the licensing standard II for a homogeneous jelly-like or mousse-like food, with respect to the properties of a food suited for people having difficulty in eating or swallowing.

Comparative Example 2

A gelation product was obtained in the same manner as in Example 1 except that the methyl cellulose produced in Comparative Synthesis Example 2 was used. In the same manner as in Example 1, various properties of the obtained gelation product were determined with a texture analyzer at various temperatures, the sensory evaluation was performed by 10 evaluators, and the syneresis properties were evaluated. The results are shown in Table 2.

Regarding various properties of the gelation product obtained in Comparative Example 2, each of the storage modulus G' (75° C.) and the storage modulus G' (75 to 45° C.) of a 2.0% by weight aqueous solution of the methyl cellulose was out of the range defined for the invention, so that the product heated at 75° C. had insufficient shape retention properties and failed to maintain the shape of the gelation product.

Comparative Example 3

A gelation product was obtained in the same manner as in Example 1 except that the methyl cellulose produced in Comparative Synthesis Example 3 was used. In the same manner as in Example 1, various properties of the obtained gelation product were determined with a texture analyzer at various temperatures, the sensory evaluation was performed by 10 evaluators, and the syneresis properties were evaluated. The results are shown in Table 2.

Regarding various properties of the gelation product obtained in Comparative Example 3, the product heated at 75° C. had insufficient shape retention properties. The product heated at 75° C. was allowed to stand in an environment of room temperature, and a resulting gelation product at 45° C. had an adhesiveness of 1,600 J/m$^3$ or more, indicating high adhesiveness of the gelation product.

Based on the results of Examples 1 to 11 and Comparative Examples 1 to 3, the hardness, the adhesiveness and the cohesiveness determined with a texture analyzer; the shape retention properties, the stickiness during chewing and the chewing properties in the sensory evaluation by 10 evaluators; and the syneresis properties were compared.

When methyl cellulose has a storage modulus G' (75° C.) within the range for the invention, a corresponding gelling composition and a food containing the composition heated at 75° C. or more are not deformed and have shape retention properties in the evaluation by evaluators. In contrast, when methyl cellulose heated at 75° C. is allowed to stand in an environment of room temperature to reach 45° C., and a storage modulus G' (75 to 45° C.) does not satisfy the lower limit of the present invention, a corresponding product has insufficient shape retention properties in the evaluation by evaluators. When the storage modulus G' (75 to 45° C.) of methyl cellulose is more than the upper limit of the invention, evaluators sense elasticity during chewing and difficulty in swallowing, so that such a product is unsuited for people having difficulty in eating or swallowing. When the viscosity at 20° C. of a 2.0% by weight aqueous solution of methyl cellulose is more than the upper limit of the invention, more than half of the evaluators sense stickiness during chewing.

As described above, the sensory evaluation results by 10 evaluators can be quantitatively determined by the hardness, adhesiveness and cohesiveness measured with a texture analyzer.

TABLE 2

| | | | at 75° C. | | | | | at 45° C. cooled from 75° C. | | | | | |
|---|---|---|---|---|---|---|---|---|---|---|---|---|---|
| | | | quantitative evaluation with texture analyzer | | | sensory evaluation by ten evaluators | | quantitative evaluation with texture analyzer | | | sensory evaluation by ten evaluators | | |
| | methyl cellulose | Low temp. gelling agent | hardness (N/m$^2$) | adhesiveness (J/m$^3$) | cohesiveness | shape retention properties | syneresis (g) | hardness (N/m$^2$) | adhesiveness (J/m$^3$) | cohesiveness | shape retention properties | stickiness during chewing | chewing properties | syneresis (g) |
| Example1 | Syn. Ex. 1 | gellan gum | 8900 | 150 | 0.86 | A | 0.05 | 5600 | 160 | 0.88 | A | A | A | 0 |
| Example2 | Syn. Ex. 2 | gellan gum | 9500 | 165 | 0.82 | A | 0.04 | 5750 | 200 | 0.84 | A | A | A | 0 |
| Example3 | Syn. Ex. 3 | gellan gum | 11000 | 180 | 0.84 | A | 0.05 | 6000 | 220 | 0.85 | A | A | A | 0 |
| Example4 | Syn. Ex. 4 | gellan gum | 12300 | 160 | 0.83 | A | 0.08 | 6200 | 210 | 0.86 | A | A | A | 0 |
| Example5 | Syn. Ex. 5 | Agar | 14000 | 150 | 0.82 | A | 0.10 | 7000 | 200 | 0.86 | A | A | A | 0 |
| Example6 | Syn. Ex. 6 | Agar | 8500 | 180 | 0.80 | A | 0.09 | 5000 | 150 | 0.81 | A | A | A | 0 |
| Example7 | Syn. Ex. 7 | gelatin | 8000 | 250 | 0.89 | A | 0.35 | 4800 | 210 | 0.86 | A | A | A | 0 |
| Example8 | Syn. Ex. 8 | gelatin | 7500 | 220 | 0.90 | A | 0.30 | 4300 | 180 | 0.88 | A | A | A | 0 |
| Example9 | Syn. Ex. 1 | gellan gum | 7000 | 350 | 0.82 | A | 0.12 | 5800 | 450 | 0.84 | A | A | A | 0 |
| Example10 | Syn. Ex. 1 | gellan gum | 7200 | 420 | 0.84 | A | 0.15 | 6200 | 500 | 0.85 | A | A | A | 0 |
| Example11 | Syn. Ex. 1 | gellan gum | 5700 | 380 | 0.80 | A | 0.20 | 4500 | 410 | 0.83 | A | A | A | 0 |

TABLE 2-continued

| | | | at 75° C. | | | | | at 45° C. cooled from 75° C. | | | | | | |
|---|---|---|---|---|---|---|---|---|---|---|---|---|---|---|
| | | | quantitative evaluation with texture analyzer | | | sensory evaluation by ten | | quantitative evaluation with texture analyzer | | | sensory evaluation by ten evaluators | | | |
| | | | | | | evaluators shape | | | | | shape | | | |
| | methyl cellulose | Low temp. gelling agent | hardness (N/m²) | adhesiveness (J/m³) | cohesiveness | retention properties | syneresis (g) | hardness (N/m²) | adhesiveness (J/m³) | cohesiveness | retention properties | stickiness during chewing | chewing properties | syneresis (g) |
| Comp. Ex. 1 | Comp. Syn. Ex. 1 | gellan gum | 12500 | 160 | 0.81 | A | 0.01 | 11000 | 200 | 0.94 | A | A | F | 0 |
| Comp. Ex. 2 | Comp. Syn. Ex. 2 | gellan gum | 1650 | 200 | 0.56 | F | 0.50 | 3500 | 500 | 0.65 | B | A | A | 0 |
| Comp. Ex. 3 | Comp. Syn. Ex. 3 | gellan gum | 1800 | 160 | 0.58 | F | 0.50 | 3600 | 1600 | 0.66 | B | F | A | 0 |

The invention claimed is:

1. A gelling composition comprising:
methyl cellulose, a 2.0% by weight aqueous solution of which has a storage modulus G'(75° C.) at 75° ° C. of 3,000 to 5,500 Pa, a 2.0% by weight aqueous solution of which has a return temperature storage modulus G'(75 to 45° C.) of 2,000 to 3,600 Pa when a temperature of the aqueous solution is returned from 75° C. to 45° C., and a 2.0% by weight aqueous solution of which has a viscosity at 20° C. of 3,000 to 10,000 mPa·s, as determined by using a Brookfield type viscometer;
a gelling agent having a gelation temperature lower than a gelation temperature of the methyl cellulose; and
a solvent.

2. The gelling composition according to claim 1, wherein a 2.0% by weight aqueous solution of the methyl cellulose has a gelation temperature of 40 to 55° C.

3. The gelling composition according to claim 1, wherein the methyl cellulose has a degree of substitution (DS) of methoxy groups per glucose unit of 1.61 to 2.03.

4. The gelling composition according to claim 1, wherein the gelling agent is one or more gelling agents selected from the group consisting of gelatin, agar, carrageenan, gellan gum, native gellan gum, a combination of xanthan gum and a galactomannan, psyllium seed gum, and curdlan.

5. A food comprising the gelling composition according to claim 1.

6. The gelling composition according to claim 2, wherein the methyl cellulose has a degree of substitution (DS) of methoxy groups per glucose unit of 1.61 to 2.03.

7. The gelling composition according to claim 2, wherein the gelling agent is one or more gelling agents selected from the group consisting of gelatin, agar, carrageenan, gellan gum, native gellan gum, a combination of xanthan gum and a galactomannan, psyllium seed gum, and curdlan.

8. The gelling composition according to claim 3, wherein the gelling agent is one or more gelling agents selected from the group consisting of gelatin, agar, carrageenan, gellan gum, native gellan gum, a combination of xanthan gum and a galactomannan, psyllium seed gum, and curdlan.

9. The gelling composition according to claim 6, wherein the gelling agent is one or more gelling agents selected from the group consisting of gelatin, agar, carrageenan, gellan gum, native gellan gum, a combination of xanthan gum and a galactomannan, psyllium seed gum, and curdlan.

10. A food comprising the gelling composition according to claim 2.

11. A food comprising the gelling composition according to claim 3.

12. A food comprising the gelling composition according to claim 4.

13. A food comprising the gelling composition according to claim 6.

14. A food comprising the gelling composition according to claim 7.

15. A food comprising the gelling composition according to claim 8.

16. A food comprising the gelling composition according to claim 9.

* * * * *